US008948211B2

(12) United States Patent
Farrow

(10) Patent No.: US 8,948,211 B2
(45) Date of Patent: Feb. 3, 2015

(54) PERFORMANCE EVALUATION OF A COMMUNICATIONS NETWORK USING JITTER PARAMETER VALUES

(75) Inventor: Nicholas W Farrow, Ipswich (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 641 days.

(21) Appl. No.: 12/989,846

(22) PCT Filed: Apr. 24, 2009

(86) PCT No.: PCT/GB2009/001042
§ 371 (c)(1),
(2), (4) Date: Oct. 27, 2010

(87) PCT Pub. No.: WO2009/133345
PCT Pub. Date: Nov. 5, 2009

(65) Prior Publication Data
US 2011/0044203 A1   Feb. 24, 2011

(30) Foreign Application Priority Data

Apr. 28, 2008 (EP) .................................. 08251538

(51) Int. Cl.
*H04L 1/20* (2006.01)
*H04L 12/26* (2006.01)

(52) U.S. Cl.
CPC ........... *H04L 43/0858* (2013.01); *H04L 43/106* (2013.01)
USPC ........ 370/516; 370/508; 370/519; 455/242.1; 455/242.2

(58) Field of Classification Search
USPC ......... 370/338, 352, 353, 396, 516, 229–235, 370/316, 253, 395.21, 508, 517–519; 709/240; 455/67.16, 242.1, 242.2
See application file for complete search history.

(56) References Cited

U.S. PATENT DOCUMENTS 6,327,274 B1 * 12/2001 Ravikanth ...................... 370/516
6,747,999 B1 *  6/2004 Grosberg et al. ............. 370/516
(Continued)

FOREIGN PATENT DOCUMENTS

EP    1 838 066    9/2007
WO   02/33893     4/2002

OTHER PUBLICATIONS

Li, C., Almhana, J., Li, J., Liu, Z., and McGorman, R., *An Adaptive IEEE 802.11 Scheme for Voices and Data Services in Wireless LANs*, Computer Science Department, University of Moncton, Moncton, Canada; State Key Laboratory of Integrated Service Networks, Xidian University, Shaanxi, China; Nortel, Toronto, Canada; Fifth Annual Conference on Communication Networks and Services Research, 2007, 5 pgs.

(Continued)

*Primary Examiner* — Andrew Lai
*Assistant Examiner* — John Lequang
(74) *Attorney, Agent, or Firm* — Nixon & Vanderhye P.C.

(57) ABSTRACT

The present invention relates to a method of operating a communications network, comprising the steps of: receiving a plurality of packets from a network node; determining a first parameter based on the time period between the reception of a packet and the reception of the subsequent packet; determining a second parameter based on the variation of the first parameter; and determining the performance of the communications network in accordance with the ratio of the second parameter to the first parameter.

18 Claims, 7 Drawing Sheets

(56) References Cited

U.S. PATENT DOCUMENTS

| | | | |
|---|---|---|---|
| 7,370,126 B2 * | 5/2008 | FitzGerald | 710/52 |
| 7,599,399 B1 * | 10/2009 | Bugenhagen | 370/516 |
| 8,081,622 B2 * | 12/2011 | Makiuchi et al. | 370/352 |
| 2004/0013089 A1 * | 1/2004 | Taneja et al. | 370/235 |
| 2004/0073690 A1 | 4/2004 | Hepworth et al. | |
| 2004/0184404 A1 * | 9/2004 | Carpenter et al. | 370/235 |
| 2006/0095612 A1 * | 5/2006 | FitzGerald | 710/52 |
| 2007/0064604 A1 * | 3/2007 | Chen et al. | 370/230 |
| 2007/0177521 A1 | 8/2007 | Fukuyama et al. | |
| 2007/0223467 A1 * | 9/2007 | Makiuchi et al. | 370/363 |
| 2008/0049753 A1 * | 2/2008 | Heinze et al. | 370/392 |
| 2008/0240004 A1 * | 10/2008 | Shaffer et al. | 370/296 |
| 2009/0193144 A1 * | 7/2009 | Zeitak | 709/240 |
| 2010/0220593 A1 * | 9/2010 | Fujiwara et al. | 370/235 |

OTHER PUBLICATIONS

International Search Report for PCT/GB2009/001042, mailed Jun. 10, 2009.

* cited by examiner

PERFORMANCE EVALUATION OF A COMMUNICATIONS NETWORK USING JITTER PARAMETER VALUES

This application is the U.S. national phase of International Application No. PCT/GB2009/001042 filed 24 Apr. 2009, which designated the U.S. and claims priority to European Application No. 08251538.8, filed 28 Apr. 2008, the entire contents of each of which are hereby incorporated by reference.

BACKGROUND AND SUMMARY

The present invention relates to a method of operating a communications network and in particular to method of determining the performance of a wireless communications network There is a developing trend for voice and data communications to be more available and to be made using a wider range of devices. An example of this is the ability to make voice over IP (VoIP) calls using a range of devices, such as mobile phones, PDAs, laptop computers, etc. Such calls may be routed via domestic wireless access points (WAPs) or via a publicly accessible WAP, such as those provided as a part of the applicant's BT Openzone™ service, for example using WiFi technology (standardised in the IEEE 802.11 family of standards).

For any wireless communication system the available capacity must be shared between all those who wish to use it and an excessive number of users, amount of traffic or type of traffic may lead to poor quality of service. For example, WiFi uses a Carrier Sense Multiple Access with Collision Avoidance (CSMA/CA) protocol: a mobile terminal that wishes to send a packet will monitor the wireless channel for a predetermined period of time and if the channel is not in use by another terminal or the WAP then the terminal will send the packet. The terminal will then wait to received an acknowledgement signal from the WAP to indicate that the packet was received. If the acknowledgment signal is not received then the terminal will wait a longer period of time before sending any subsequent packets. It can be seen that if a number of terminals are sending a steady stream of packets, as would be the case when using VoIP over WiFi, then there may be a significant number of collisions between packets. This may then lead to all terminals to 'back-of' for an increasing period of time, which will lead to a further decrease in network efficiency and a decrease in voice quality for VoIP sessions.

A proposal to address this problem is disclosed by "*An Adaptive IEEE* 802.11 *Scheme for Voice and Data Services in Wireless LANs*", C Li et al, IEEE Fifth Annual Conference on Communication Networks and Services Research (CNSR'07) in which the 802.11 standard is modified to include an adaptive algorithm such that real time traffic (such as VoIP) is handled differently from non-real time browsing (e.g. web surfing, downloads, etc.) such that the overall network performance is improved.

EP-A-1 836 066 discloses a jitter buffer controller which measures the jitter of received voice packets, compares the jitter values against a statistical distribution of jitter values and determines whether or not the jitter buffer is capable of absorbing the measured jitter of the received voice packet.

US2004/0073690 discloses a communications device which is able to collect one or more bandwidth-related metrics or parameters which can be associated with the audio quality of a voice communication session. If the metrics or parameters do not exceed a predetermined threshold then a voice communication session is not established.

According to a first aspect of the present invention there is provided a method of operating a wireless communications network, the method comprising the steps of: a) receiving a plurality of packets from a network node connected to the wireless communications network; b) determining a plurality of packet period parameter values, the packet period parameter being based on the time period between the reception of a packet and the reception of the subsequent packet; c) determining a plurality of jitter parameter values based on the variation of more than one packet period parameter values; and d) determining the performance of the wireless communications network in accordance with the ratio of the jitter parameter to the packet period parameter. Preferably, the method comprises the further step of e) taking corrective action if the ratio of the jitter parameter to the packet period parameter determined in step d) exceeds a predetermined ratio.

In one embodiment of the present invention a plurality of packets are received from a plurality of network nodes connected to the wireless communications network and the ratio of the jitter parameter to the packet period parameter is determined for the communication sessions associated with each of the plurality of network nodes. In such a case, step e) may comprises the step of not accepting any further communications sessions until ratio of the jitter parameter to the packet period parameter determined in step d) is less than an acceptable ratio and/or step e) may comprise terminating the communication sessions associated with one or more of the plurality of network nodes.

According to a second aspect of the present invention there is provided apparatus for use in a wireless communications network configured to, in use, receive a plurality of packets the wireless communications network; determine a plurality of packet period parameter values, the packet period parameter being based on the time period between the reception of a packet and the reception of the subsequent packet; determine a plurality of jitter parameter values based on the variation of more than one packet period parameter values; and determine the performance of the wireless communications network in accordance with the ratio of the jitter parameter to the packet period parameter. The may be further configured to, in use, take corrective action if the ratio of the jitter parameter to the packet period parameter exceeds a predetermined ratio.

According to a third aspect of the present invention there is provided a wireless access point comprising a wireless interface and an interface to a further network, the access point being configured in use to: i) receive one or more sessions from a wireless communication network, each session comprising a plurality of packets; and for each of the sessions: ii) determine a plurality of packet period parameter values, the packet period parameter being based on the time period between the reception of a packet and the reception of the subsequent packet; iii) determine a plurality of jitter parameter values based on the variation of more than one packet period parameter values; and iv) determine the performance of the wireless communications network in accordance with the ratio of the jitter parameter to the packet period parameter.

According to a fourth aspect of the present invention there is provided a computer product comprising computer executable code for the performance of a method as described above.

BRIEF DESCRIPTION OF THE DRAWINGS

Embodiments of the present invention will now be described, by way of example only, with reference to the accompanying drawings in which.

DETAILED DESCRIPTION OF PRESENT EXAMPLE EMBODIMENTS

Figure 1:
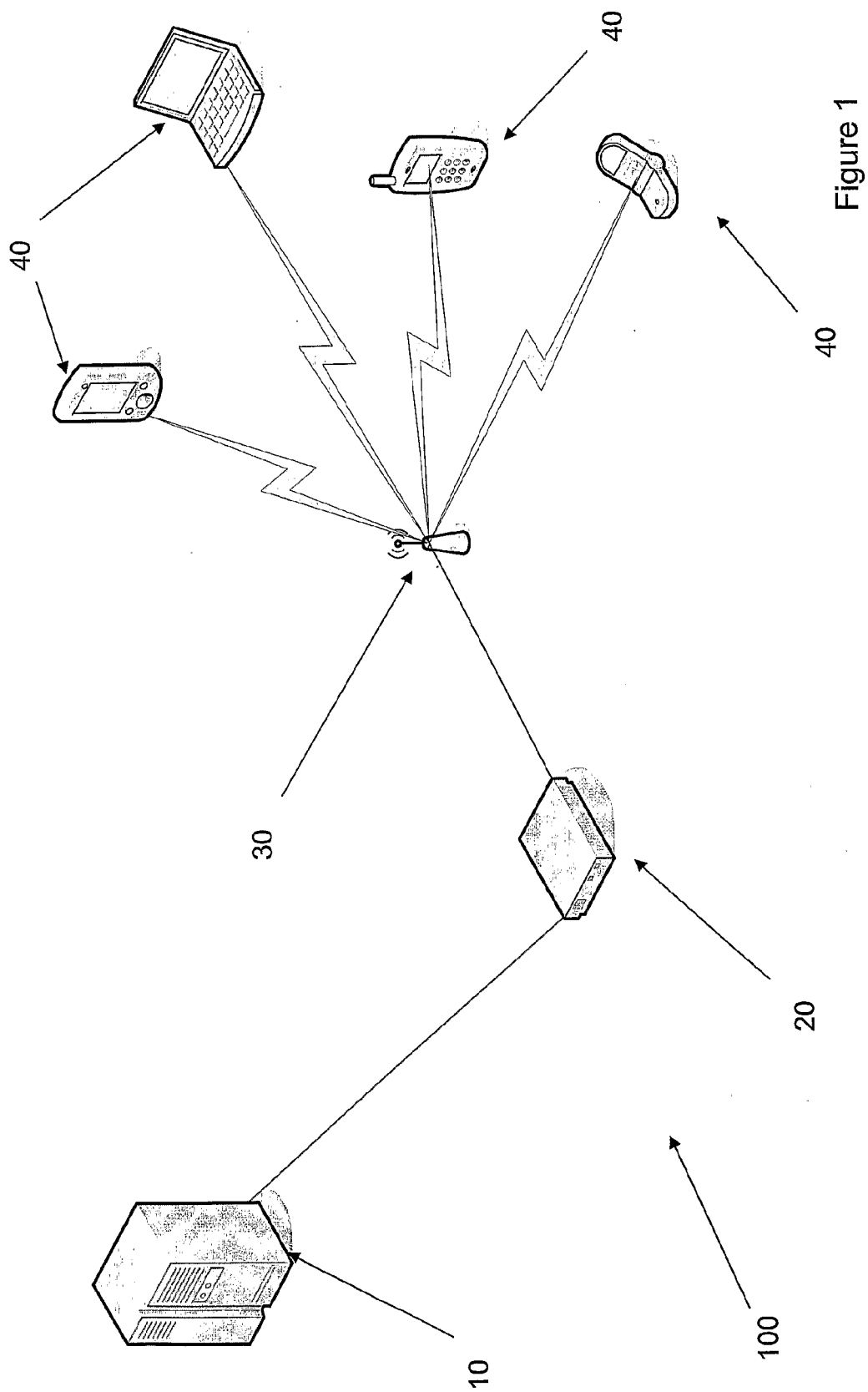
FIG. 1 shows a schematic depiction of a communications network in which a method according to the present may be used.

FIG. 1 shows a schematic depiction of a communications network 100 in which a method according to the present may be used. The communications network comprises a core node 10, digital subscriber line access multiplexer (DSLAM) 20, wireless access point (WAP) 30 and a plurality of mobile terminals 40 that are capable of wireless communication using, for example, WiFi with the WAP 30. In use, one or more of the mobile terminals has an active real time communication session with the WAP; these communication sessions are carried over a DSL link from the WAP to the DSLAM 20 and the DSLAM sends the data on to the core node 10. The core node routes the data to a further core node (not shown) or a further DSLAM (not shown) such that the communication sessions reach their intended destination.

When one or more of the mobile terminals wishes to begin a VoIP session, the session will be set-up (for example using the Session Initiation Protocol (SIP)). During the session set-up it will be determined, amongst other matters, the frequency at which data packets will be sent. Typically, a VoIP packet will be sent every 10-40 ms, although it will be understood that packets may sent with a lesser or greater time period between subsequent packets. As VoIP sessions will use UDP, rather than TCP, as the transport layer protocol there is no capability to request that a packet is resent in the event that it is not received in the correct sequence. If RTP (Real-time Transport Protocol) is used, then the sequence numbering provided by RTP may in theory be used to re-order packets that are delivered out of sequence.

Figure 2:
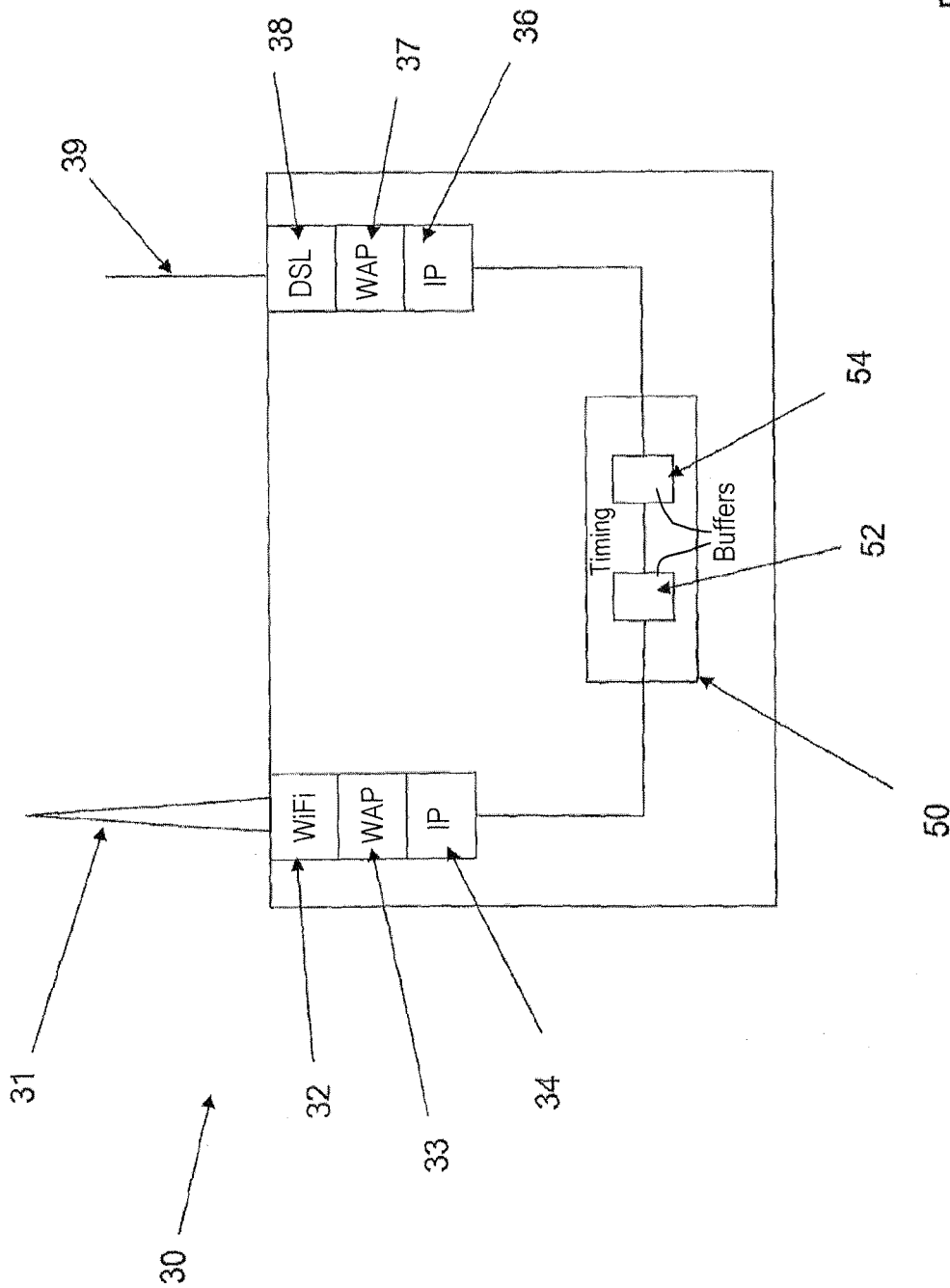
FIG. 2 shows a schematic depiction of a wireless access point.

FIG. 2 shows a schematic depiction of the wireless access point 30 as it receives VoIP packets from a mobile terminal and forwards the packet to the DSLAM 20. The WAP 30 comprises an antenna 31 that receives packets from mobile terminals. The packets are converted from the wireless domain to the electrical domain by the antenna 31 and are then passed to a WiFi interface 32, WAP operating system 33 and a first IP stack 34. VoIP packets are received at the application layer and may then be forwarded to the DSLAM. The VoIP packets are sent via a second IP stack 36, WAP operating system 37, DSL interface 38 and a cable 39.

It is possible to obtain an indication of how well the WiFi network is operating by measuring the temporal variation of received VoIP packets—if there is no network congestion then if a terminal is generating a VoIP packet every 10 ms then the WAP should also receive a packet every 10 ms. It has been realised that by measuring the inter-packet period, the variation in the inter-packet period and the packet delivery patterns that it is possible to infer the level of WiFi network loading. If it is determined that the network load is too high then it is possible to take actions to mitigate the network loading.

For the following discussion, the time period between one VoIP packet and the subsequent VoIP packet will be referred to as the packet period. The modulo of the difference between a value of the packet period and the subsequent value of the packet period will be referred to as jitter.

Figure 3:
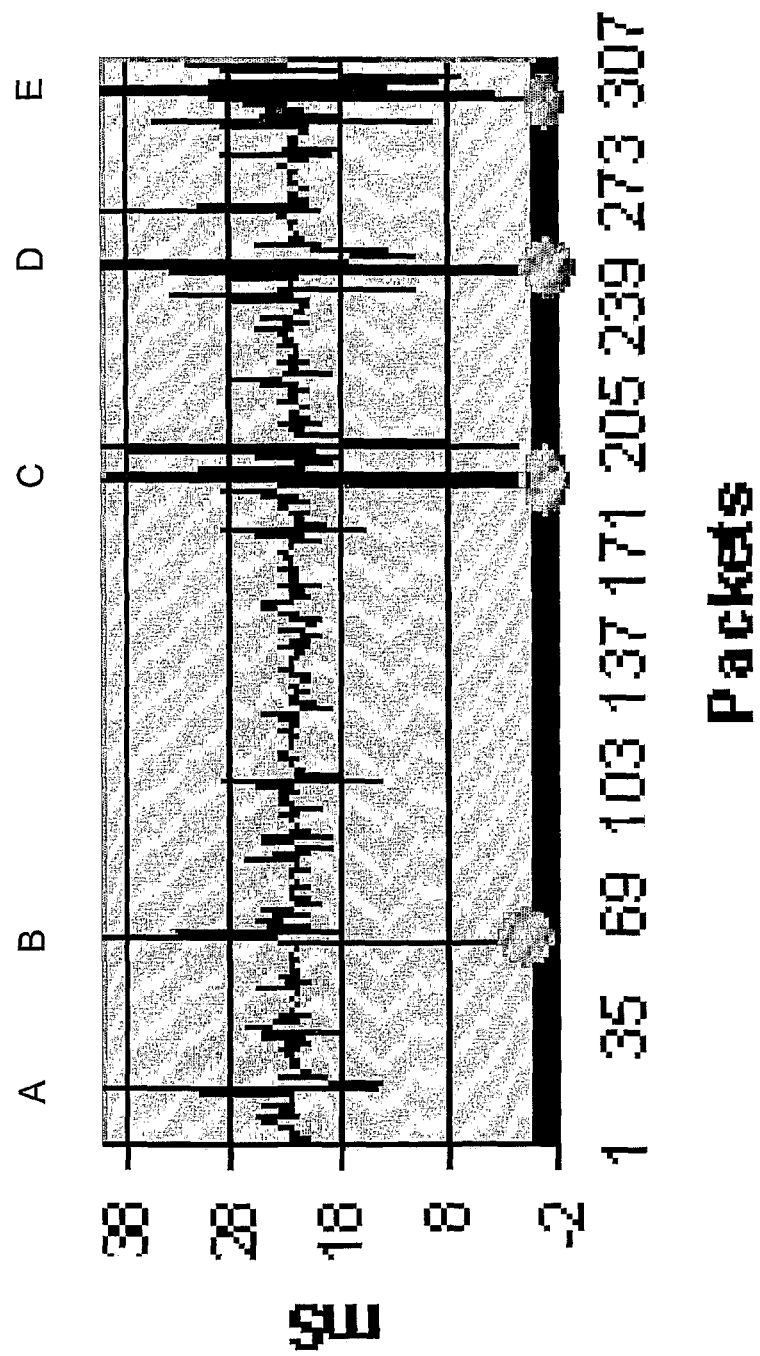
FIG. 3 shows a graphical depiction of the variation of jitter with time for a VoIP session.

FIG. 3 shows a graphical depiction of the variation of jitter with time for a VoIP session using a WAP that is supporting a number of other VoIP sessions. It can be seen from FIG. 3 that there are 5 incidents in which there is a significant rise in the jitter value: at incidents B, C, D & E there is also a lost packet. Ideally, it would be possible to modify the operation of the network in response to such increases in jitter so that the possibility of a packet becoming lost is decreased.

Referring to FIG. 2 again, a WAP according to the present invention further comprises timing module 50 which comprises first and second buffers 52 & 54. First and second buffers 52 & 54 preferably comprise ring buffers. In use, the timing module uses the recv call to timestamp each VoIP packet as it is received at the application layer of the WAP. Subsequent timestamps are used to generate packet period values and these packet period values are written to the first ring buffer. Subsequent packet period values are used to calculate a jitter value, which is written to the second ring buffer.

Figure 4:
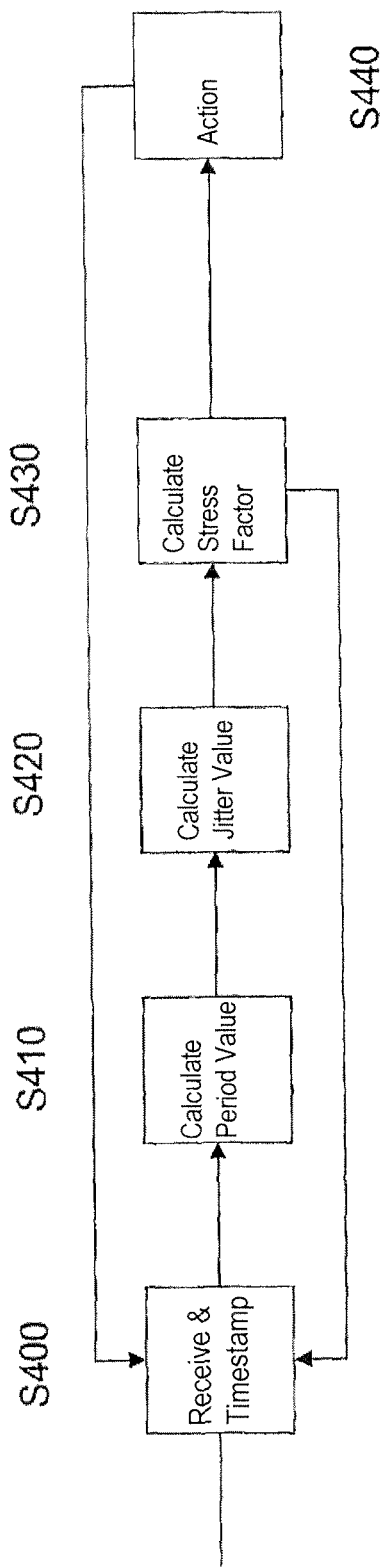
FIG. 4 shows a schematic depiction of a flow chart which describes the operation of a method according to the present invention.

FIG. 4 shows a schematic depiction of a flow chart which describes the operation of a first method according to the present invention. At step S400 a packet is received at the application layer and timestamped. The timestamp value is used at S410 to calculate a value of the packet period which is then written to the first ring buffer. The packet period value will be used at S420 to calculate a jitter value which is then written to the second ring buffer. At step S430 a stress factor is calculated by determining the ratio of the average jitter value (which is calculated from all the values held in the second ring buffer) to the average packet period value (which is calculated from all the values held in the first ring buffer). If the stress factor is less than or equal to a predetermined value, for example 1, then the network performance is perceived to be acceptable and the process returns to step S400 to await the next packet. If the stress factor is greater than a predetermined value then the network performance is inadequate and at S440 some form of action may be taken to lessen the load on the network (see below). It will be understood that for the first few packets received it will not be possible to calculate a packet period or jitter value but that this condition will not persist for an appreciable period of time.

Figure 5:
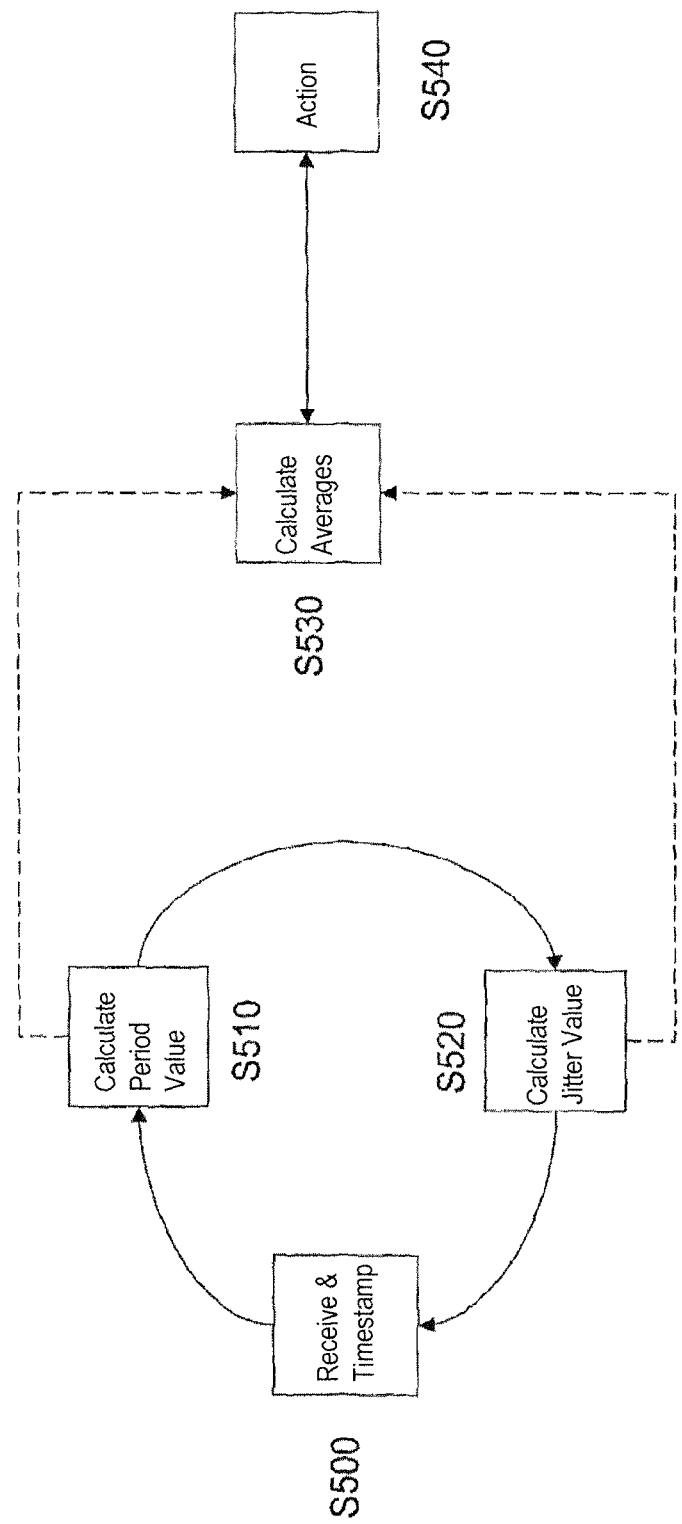
FIG. 5 shows an alternative to the method described with reference to FIG. 4.

It will be understood that the two aspects of the method described above with reference to FIG. 4 may be decoupled. FIG. 5 shows an alternative to the method descried with reference to FIG. 4 in which at step S500 a packet is received at the application layer and timestamped. The timestamp value is used at S510 to calculate a value of the packet period which is then written to the first ring buffer. The packet period value will be used at S520 to calculate a jitter value which is then written to the second ring buffer and then the process returns to step S500 so that as packets arrive the first and second ring buffers are updated. Separately, at step S530 the average packet period value and the average jitter value are calculated and the stress factor is determined. If the stress factor is less than or equal to a predetermined value then the process will pause for a predetermined period of time before re-calculating the average packet period value and the average jitter value, and then the stress factor. If the stress factor is greater than the predetermined value then the process moves to step S540 where some remedial or corrective action is taken (see below) to improve network performance and the process returns to step S530.

It will be understood that the method described above with reference to FIG. 5 may be of use in mobile terminals, such as, for example, mobile telephones, where there is limited processing capability and it may not be feasible or practical to calculate the stress factor each time that a VoIP packet is received. In such a case, the stress factor may be determined at a predetermined period which is a multiple of the time period at which VoIP packets are sent.

In the methods described above with reference to FIGS. 4 & 5, average values for the packet period and jitter are used to smooth out variations caused by a small number of packets. It has been found that the performance of these methods can be improved by adding further steps that reduce short term variation of the average jitter value.

Figure 6:
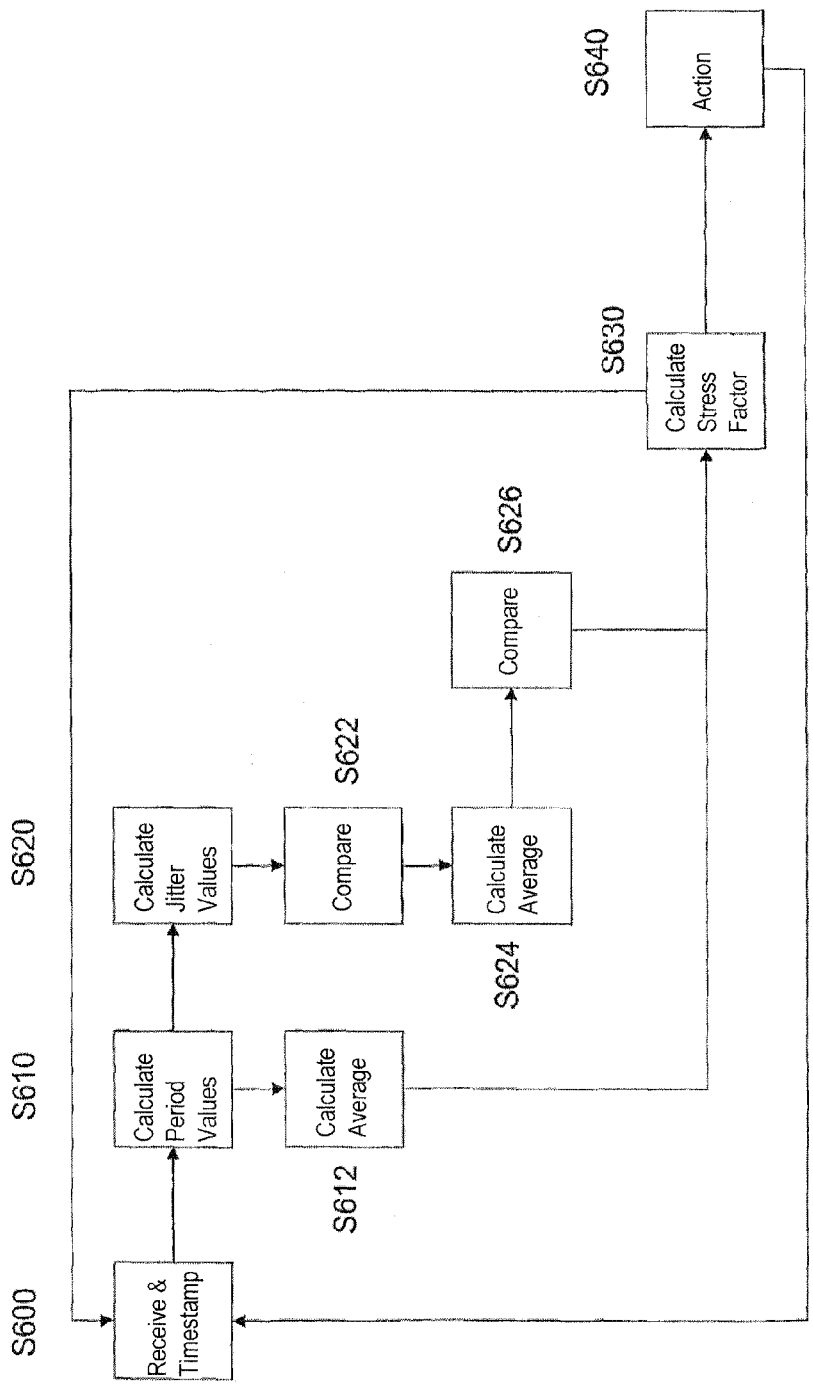
FIG. 6 shows a schematic depiction of a method according to a second aspect of the present invention.

FIG. 6 shows a schematic depiction of a method according to a second aspect of the present invention. At step S600 a VoIP packet is received at the application layer and is timestamped. The time stamp data is then used at steps S610 & S620 to calculate packet period values and jitter values respectively. At step S612 the period packet value is written into the first ring buffer and an average period packet value is calculated. At step S622 the jitter value calculated at step S620 is compared with a predetermined threshold value; if the calculated jitter value is less than or equal to the predetermined threshold jitter value then the calculated value is written to the second ring buffer and an average jitter value is calculated at step S624. If the calculated jitter value is greater than the predetermined threshold value then the predetermined threshold value is written to the second ring buffer and an average jitter value is calculated (S624). The average jitter value calculated at step S624 is then compared with the previous average jitter value at S626. If the new average jitter value is less than a predetermined fraction of the previous average jitter value then the new average jitter value is adjusted to equal that predetermined fraction of the previous average jitter value; otherwise the average jitter value calculated at step S624 is retained. The average jitter value obtained from S626 and the average period packet value calculated at S612 are used to calculate the stress factor at S630.

If the stress factor is less than or equal to a predetermined threshold value then the method returns to S600 to await the next VoIP packet to be received at the application layer. If the stress factor is greater than the predetermined threshold value then the method, at step S640, takes some corrective action to lessen the stress factor (see below) before returning to S600. It will readily appreciated that the aspects of the method discussed above with reference to FIG. 6 may be decoupled in a similar manner to that discussed above with reference to FIGS. 4 & 5.

The size of the first and second ring buffers need not be equal. Preferably the size these buffers can be configurable by a network operator or user but it has been found that storing 200 seconds of packet period data in the first ring buffer and 3 seconds of jitter data in the second ring buffer provides adequate detection performance. By using a 3 second buffer in the second ring buffer it is possible to average out random spikes that may occur over the radio network. It will be understood that this value may be changed but 3 s presents a reasonable trade-off between detection responsiveness and masking random events.

The predetermined threshold jitter value referred to above in step S622 may be a number of times the average jitter value that is calculated from the values held in the second ring buffer, such as three times the average jitter value. Alternatively, when the VoIP session is first established a training session may be held. During the training session (which may be defined in terms of its duration or the number of VoIP packets received) the jitter values are determined as described above and an average trained jitter value is determined. This average trained jitter value may be the basis for the predetermined threshold jitter value. Some devices exhibit packet period drift over time, so a session which sends packets every 10 ms may drift up or down a few ms. Whilst this may not very significant with sessions that sends packets every 40 ms streams, taking a fixed trained value may cause problems for session having a packet period of 10 ms when drift is experienced. Furthermore, when WiFi networks are very stressed then it is possible for delays of over a second to occur. Because of this, a maximum jitter value, which may be between 2 and 4 times the trained jitter value, is used in the event that the actual jitter value exceeds this maximum value (at step S622). This limitation helps to ensures a predictable transition from such a stressed condition back to more normal operations. The initial trained jitter value may also be used when a packet drop is detected.

The predetermined fraction of the previous average jitter value referred to above with regard to step S626 is preferably a large fraction to reduce the rate of change in the jitter value. It has been found that 95% is a suitable value. The limiting of individual jitter values and the smoothing of the average jitter value have been found to improve the operation of the present invention.

All the embodiments of the present invention discussed above generate a stress factor which is indicative of the level of loading on the WiFi network. This stress factor can be used to modify the behaviour of one or more terminals or nodes that are using the WiFi network. The exact nature of this modification will depend on the nature of the devices that are performing the method according to the present invention.

It will be understood that a method according to the present invention may be implemented within a mobile terminal, based on the timestamps of VoIP packets received from a WAP. If a terminal detects that there is a high stress factor then this may mean that the network is being heavily loaded or that the terminal lacks the resources to support a VoIP session along with the other tasks that are being processed. If the mobile terminal detects that there is a high stress factor then it may warn a user prior to initiating a VoIP call or attempt to switch an existing VoIP session to a different type of session, for example VoIP using UMTS (or another wireless protocol) or to a switched GSM session. The mobile terminal may also report the detection of a high stress factor to a network management system in case that other mobile terminals are also reporting a high stress factor.

A method according to the present invention may also be implemented within a wireless access point. It will be understood that a wireless access point will typically handle a number of simultaneous VoIP sessions and that a method according to the present invention may be used to determine a stress factor for each session. If one or two VoIP sessions are reporting a high stress factor whilst the other sessions are reporting a low stress factor then it is highly likely that the wireless terminals are the cause of the stress factor, rather than the WiFi network being overloaded. In such a case, the access point may not take any action with regard to the increase in stress factor for those terminals. However, if most of the VoIP sessions are indicating increased stress factors then it may be appropriate for the WAP to take action so as to maintain an acceptable level of network performance. This may include, for example, refusing to accept any new VoIP connections, ending one of the current VoIP connections, etc.

Figure 7:
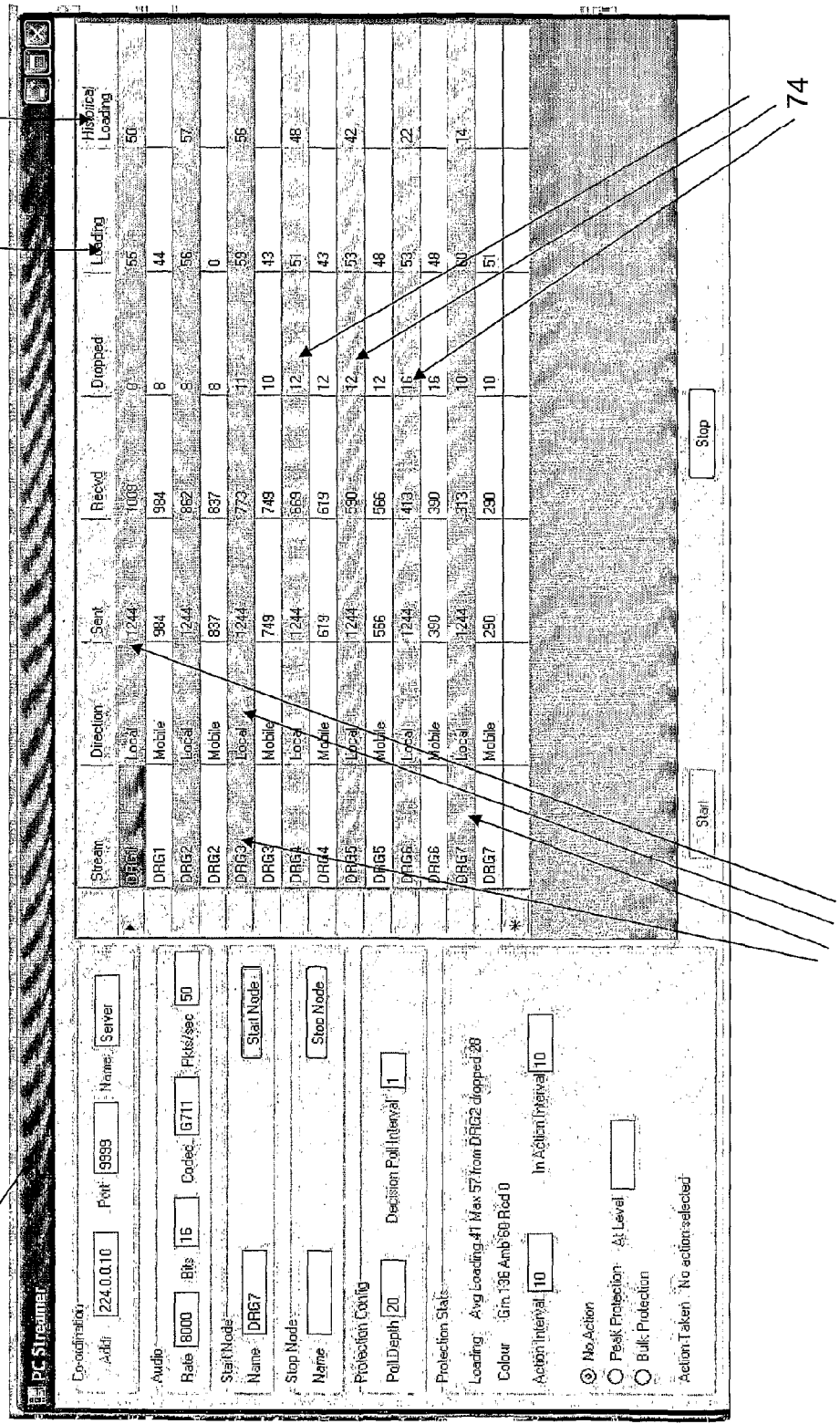
FIG. 7 shows a screen shot taken from a monitoring program which is executed by a wireless access point.

FIG. 7 shows a screen shot 70 taken from a monitoring program which is executed by a wireless access point. The screen shot shows a range of parameters calculated for seven different mobile terminals which are in communication with the wireless access point. FIG. 7 shows that the sessions to four of the mobile terminals are exhibiting increased levels of stress factor and these are shown with the darker shading (72). The other three sessions 74 are sowing acceptable levels of stress factor and these are shown with a light shading. The threshold for acceptable stress factor is 55% and it will be seen that the three sessions which have an acceptable level of stress factor are close to that threshold. The present stress factor is shown in column 76 and a historical stress factor value is shown in column 78.

The wireless access point may decide to take action so as to prevent the network performance from worsening further. This decision may be based on the number (or proportion) of sessions which have a stress factor that exceeds a predetermined threshold, the average stress factor value exceeding a predetermined threshold (or being maintained above a predetermined threshold for a predetermined period of time) etc. If the wireless access point decides to terminate one or more sessions, the sessions to be terminated may be chosen on the basis of those sessions having the highest value of stress factor at a particular point in time, the highest historical stress factor value, etc.

It also believed that the a method according to the present invention may be implemented within a network node. As there is a fixed latency between the core node and a wireless access point then any variation in the time taken for a packet to travel from a mobile terminal to a core node will be caused by the wireless connection between the mobile terminal and the WAR A core node is able to identify all streams coming from a particular WAP due to the common source MAC address. As the core node can monitor all of the sessions present at a particular WAP then it is possible to provide a consistent response when stress factors increase, for example dropping a session or renegotiating session features, such as the selection of a codec.

When the stress factor is compared against a predetermined threshold value, it will be understood that the comparison may be made against a threshold having multiple levels. For example, a stress factor greater than one may indicate a 'RED' state such immediate action is take to improve network performance (for example dropping a VoIP session); a stress factor between 0.33 and 1 may indicate an 'AMBER' state such that no further actions are taken that would lead to an increase in the stress factor; and a stress factor of less than 0.33 may indicate a 'GREEN' state in which the stress factor value is satisfactory.

It will be understood that these features may be used in combination with any of the methods discussed above with reference to FIG. 4, 5 or 6. It will also be understood that any of the predetermined values disclosed above may altered or configured as required.

It will be understood that the invention may be implemented using software that is run on one or more mobile terminals, wireless access points or network nodes. It will be understood that such software may be deployed via download, for example via the internet, or on some physical media, for example, DVD, CD-ROM, USB memory stick.

What is claimed is:

1. A method of operating a wireless communications network, the method comprising the steps of:

a) receiving a plurality of data packets comprising a real time communication session from a network node connected to the wireless communications network;
b) determining a plurality of packet period parameter values, the data packet period parameter being determine by the time period between the reception of a data packet and the reception of the subsequent data packet;
c) determining a plurality of jitter parameter values, the jitter parameter being determined by the difference between one data packet period parameter value and the subsequence data packet period parameter values; and
d) determining, using the computer system including a computer processor, the performance of the wireless communications network in accordance with the ratio of an average of the jitter parameter value determine in step c) to an average of the packet period parameter values.

2. A method according to claim 1, comprising the further step of:

e) taking corrective action if the ratio of the average jitter parameter to the average data packet period parameter values determined in step d) exceeds a predetermine ratio.

3. A method according to claim 1, wherein a plurality of data packets is received from a plurality of network nodes connected to the wireless communications network and the ratio of the average jitter parameter to the average packet period parameter values is determined for the real time communication sessions associated with each of the plurality of network nodes.

4. A method according to claim 1, further comprising:

e) taking corrective action if the ratio of the average jitter parameter to the average data packet period parameter values determined in step d) exceeds a predetermined ratio;
wherein a plurality of data packets is received from a plurality of network nodes connected to the wireless communications network and the ratio of the average jitter parameter to the average packet period parameter values is determined for the real time communication sessions associated with each of the plurality of network nodes;
wherein step e) comprises
  i) the step of not accepting any further communications sessions until the ratio of the average jitter parameter to the average data packet period parameter values determined in step d) is less than an acceptable ratio; and/or
  ii) the step of terminating the real time communication sessions associated with one or more of the plurality of network nodes.

5. A method according to claim 1, wherein the data packet comprises a Voice over IP (VoIP) packet.

6. An apparatus for use in a wireless communications network, the apparatus comprising:

a computer system, comprising a computer processor, the computer system being configure to:
  receive a plurality of data packets comprising a real time communication session from a the wireless communications network;
  determine a plurality of packet period parameter values, the data packet period parameter being determine by the time period between the reception of a data packet and the reception of the subsequent data packet;
  determine a plurality of jitter parameter values, the jitter parameter being determined by the difference between one data packet period parameter value and the subsequence data packet period parameter values; and determine the performance of the wireless communications network in accordance with the ratio of an average of the jitter parameter values to an average of the data packet period parameter values.

7. An apparatus further to claim 6, wherein the computer system is configured to take corrective action if the ratio of the average jitter parameter to the average data packet period parameter values exceeds a predetermined ratio.

8. An apparatus further to claim 7, wherein the computer system is configured to:
not accept any further communications sessions until the ratio of the average jitter parameter to the average data packet period parameter values is less than an acceptable ratio; and/or
terminate one or more of the sessions.

9. An apparatus according to claim 6, wherein the apparatus is a wireless access point comprising a wireless interface and an interface to a further network.

10. An apparatus according to claim 9, wherein the access point further comprises a first ring buffer, the access point being configured to store data packet period parameter data in the first ring buffer, wherein the data packet period parameter value is an average value of the data packet period parameter data held in the first ring buffer.

11. An apparatus according to claim 9, wherein the access point further comprises a second ring buffer, the access point being configured to store jitter parameter data in the second ring buffer wherein the jitter parameter value is an average value of the jitter parameter data held in the second ring buffer.

12. An apparatus according to claim 6, wherein the apparatus comprises a mobile terminal.

13. An apparatus according to claim 6, wherein the apparatus comprises a network node.

14. A non-transitory computer-readable medium storing computer executable code, which upon execution by a computer system to provide operation of a wireless communications network, the operation comprising:
a) receiving a plurality of data packets comprising a real time communication session from a network node connected to the wireless communications network;
b) determining a plurality of packet period parameter values, the data packet period parameter being determine by the time period between the reception of a data packet and the reception of the subsequent data packet;
c) determining a plurality of jitter parameter values, the jitter parameter being determined by the difference between one data packet period parameter value and the subsequence data packet period parameter values; and
d) determining the performance of the wireless communications network in accordance with the ratio of an average of the jitter parameter value determine to an average of the determined packet period parameter values.

15. A non-transitory computer-readable medium according to claim 14, the operation further comprising:
e) taking corrective action if the determined ratio of the average jitter parameter to the average data packet period parameter values exceeds a predetermined ratio.

16. A non-transitory computer-readable medium according to claim 14, wherein a plurality of data packets is received from a plurality of network nodes connected to the wireless communications network and the ratio of the average jitter parameter to the average packet period parameter values is determined for the real time communication sessions associated with each of the plurality of network nodes.

17. A non-transitory computer-readable medium according to claim 14 the operation further comprising:
e) taking corrective action if the determined ratio of the average jitter parameter to the average data packet period parameter values exceeds a predetermined ratio;
wherein a plurality of data packets are-is received from a plurality of network nodes connected to the wireless communications network and the ratio of the average jitter parameter to the average packet period parameter values is determined for the real time communication sessions associated with each of the plurality of network nodes;
wherein taking the corrective action comprises:
i) not accepting any further communications sessions until the determined ratio of the average jitter parameter to the average data packet period parameter values is less than an acceptable ratio; and/or
ii) terminating the real time communication sessions associated with one or more of the plurality of network nodes.

18. A non-transitory computer-readable medium according to claim 14, wherein the data packet comprises a Voice over IP (VoIP) packet.

* * * * *